May 8, 1951      G. O. HAGLUND      2,551,596
AERODYNAMIC BODY FOR CARRYING DETECTION APPARATUS
Filed May 21, 1946      3 Sheets-Sheet 1
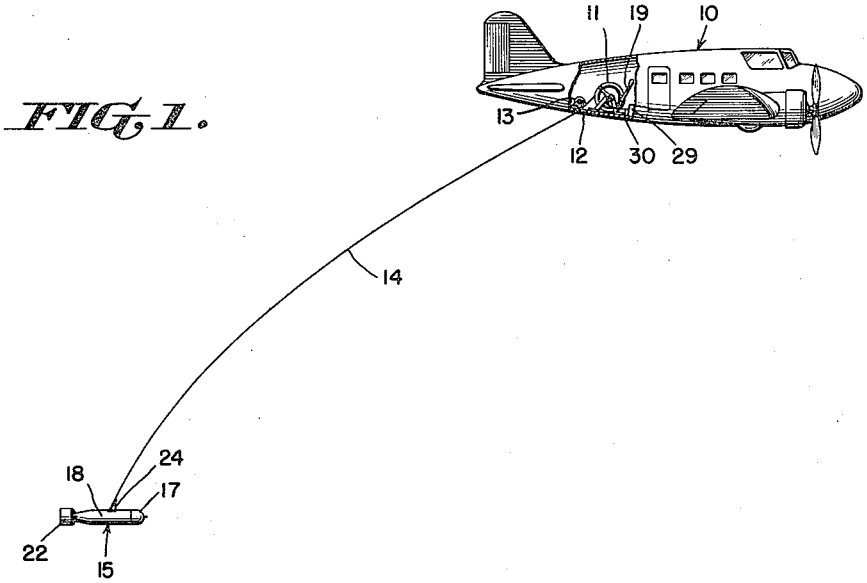
FIG. 1.
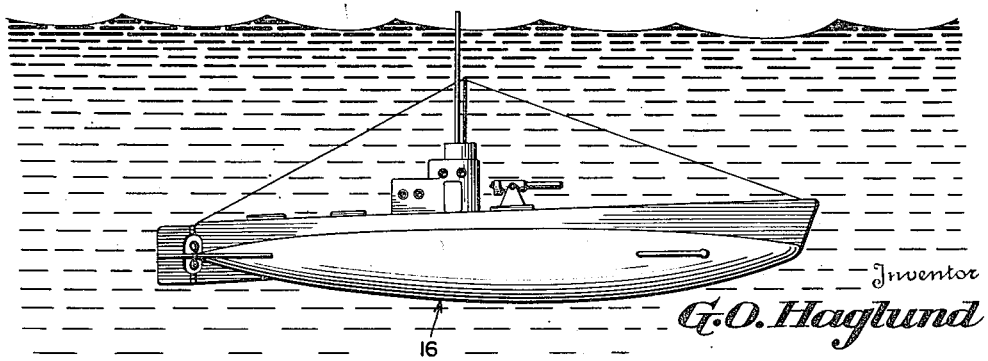
Inventor
G. O. Haglund
By M. C. Hayes
Attorney May 8, 1951  G. O. HAGLUND  2,551,596
AERODYNAMIC BODY FOR CARRYING DETECTION APPARATUS
Filed May 21, 1946  3 Sheets-Sheet 2
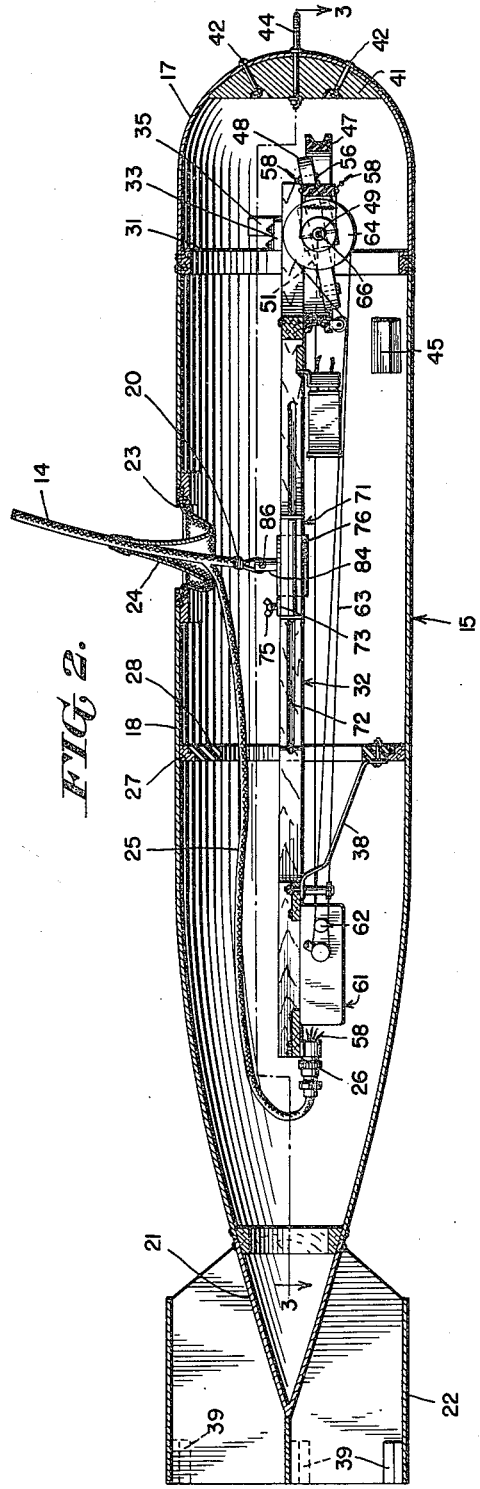
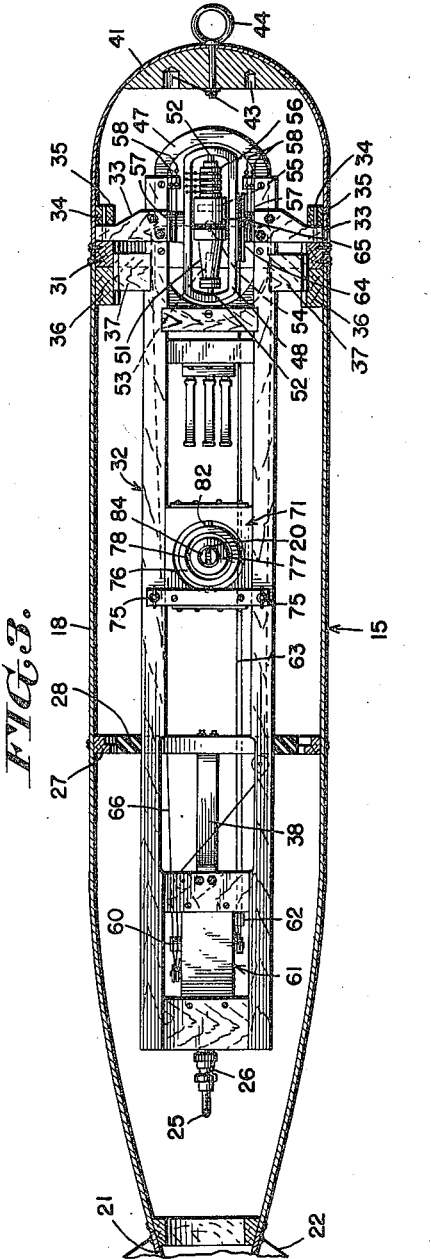
Inventor
G. O. Haglund May 8, 1951 G. O. HAGLUND 2,551,596
AERODYNAMIC BODY FOR CARRYING DETECTION APPARATUS
Filed May 21, 1946 3 Sheets-Sheet 3
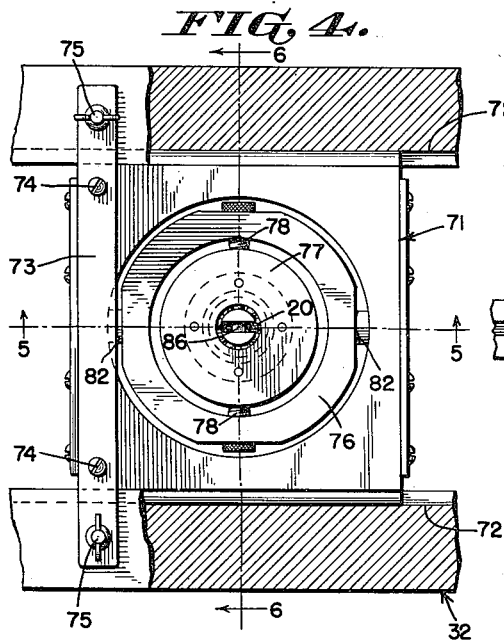
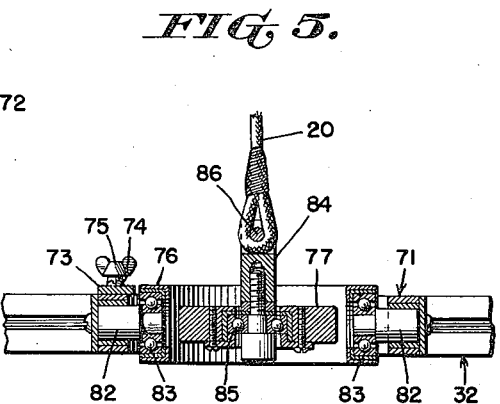
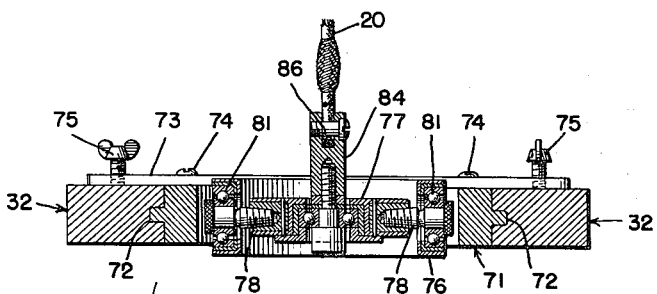
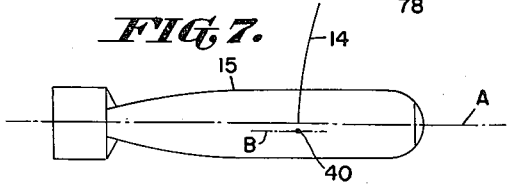
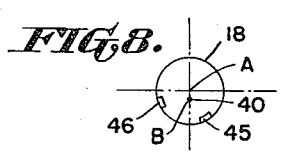
Inventor
G. O. Haglund Patented May 8, 1951

2,551,596

UNITED STATES PATENT OFFICE 2,551,596

AERODYNAMIC BODY FOR CARRYING DETECTION APPARATUS

Gerhard O. Haglund, Buffalo, N. Y.

Application May 21, 1946, Serial No. 671,341

13 Claims. (Cl. 175—183)

(Granted under the act of March 3, 1883, as amended April 30, 1928; 370 O. G. 757)

This invention relates generally to methods and means for aerial surveying of portions of the earth's surface for magnetic variations and anomalies therein from above the land or water surface thereof. More specifically this invention relates to stabilization of airborne detection and recording equipment including apparatus adapted to be towed by aircraft and methods of stabilizing aerodynamic bodies containing detection apparatus when towed at a distance behind an aircraft.

Apparatus suitable for detecting local variations in the terrestrial magnetic field ordinarily includes a magnetometer detector of very high sensitivity which must be accurately aligned with the direction of the lines of force of the magnetic field to be measured, suitable apparatus for indicating or recording the total instantaneous value of such field and control apparatus adapted to properly orient the detector element with the lines of force of the field. Variations of heading of the plane as well as any pitch and roll of the aerodynamic body consequent upon the flight of the aircraft result in continual adjustment of orientation of the detecting mechanism within the carrying body. This orientation may be accomplished in any convenient manner by apparatus automatically responsive to variations in the actual alignment of the detecting element from the ideal alignment of the element. The available automatic orienting mechanisms do not in practice operate successfully within the accuracy required except when the supporting structure for these mechanisms is kept stable and free from large or rapid changes of heading, pitch and roll during flight. In accurate magnetic surveying the orienting and detection apparatus is conveniently carried within an aerodynamic body towed beneath and behind the aircraft in order that magnetic material in the aircraft will not cause errors in the measurement of the magnetic field. This towed body must be stable in flight in order to make accurate or reliable magnetic surveys because the automatic orienting or compensating mechanisms fail to operate with sufficient accuracy when the supporting body is not maintained continuously in a highly steady and stable condition.

The problem of stabilizing such an aerodynamic body in flight when towed by a line from an aircraft has been subject to a large amount of investigation and trial. Successful use of such magnetic detection apparatus has been impracticable heretofore because of the failure of all previous attempts to stabilize in flight a towed body suitable for housing the delicate and highly sensitive detection apparatus. The apparatus herein disclosed illustrates the methods and apparatus which have been found to successfully accomplish the purpose of this invention.

When a towing cable is attached to an aerodynamic body suitable for carrying detecting and orienting apparatus at substantially its center of cross sectional form, the forces tending to cause the towed body to yaw, roll and pitch from its proper course are greatly reduced and the axis of the body tends to remain parallel to the desired course under certain conditions of adjustment of the center of gravity of the towed body with respect to the point of attachment of the towing or suspending cable. In pracice the stresses in the towing cable do not remain constant, and increases or decreases in tension of the cable generally produce upsetting forces on the body even though applied to the body at the center of form, but when the center of gravity of the body has been adjusted, by proper distribution of masses within the body, so that it falls substantially beneath the center of form, these upsetting forces are minimized. Furthermore, it has been found in practice that by arranging the center of gravity substantially away from and beneath the point of suspension a restoring force is provided which tends to quickly restore the body to its true course in case of accidental variation therefrom and that in cases where the center of gravity of the body is allowed to deviate from this position along the length of the body the body exhibits a strong tendency to dive and pitch or oscillate in a vertical direction about the desired line of flight, with resulting rapid changes in the orientation of the aerodynamic body with respect to the lines of force comprising the magnetic field. Such pitching and diving causes deviations in the measured value of field because of the inability of the automatic orienting mechanism to orient the detecting element with the lines of force of the field with sufficient rapidity and accuracy with the result that spurious magnetic indications are produced which are not readily distinguishable from actual variations of the ambient field being surveyed. When the center of gravity is displaced laterally from the position beneath the cross sectional center of form and the point of suspension there are present when the body is flown certain forces tending to turn the body such that the axis thereof is moved laterally and angularly with respect to the desired line of flight. When the body "wanders" laterally from its desired line of flight or rolls on its axis, the orienting mechanism is unable to maintain the correct orientation of the detector element with sufficient accuracy and speed and spurious signals therefore are produced in the detecting device.

By adjusting the center of gravity within that cross sectional plane which includes the point of suspension of the body to a position substantially beneath the point of suspension in accordance with the present invention it was discovered that the tendency of the body to roll about its axis or wander from its course was substantially eliminated regardless of variations in the tension in the towing line or the air pressure against the towed body. Therefore, by adjusting the point of suspension to coincide substantially with the cross sectional center of form of the body and longitudinally to the approximate center of gravity of the body and thereafter by adjusting the center of gravity to a position substantially beneath the point of suspension, a towed body of symmetrical form would be made steady and stable in flight regardless of any sudden variations of wind or air pressures normally encountered by the body in flight.

When a body is suspended beneath a plane during flight of the plane by means of a flexible cable the suspended body will normally travel through the air at a distance appreciably behind the aircraft. The term "towed body," as employed herein, may be defined as a body suspended by a cable or line to which a towing force is applied.

The angle which the towing cable makes with the axis of the towed body at the point of attachment to the body will vary during flight due to a number of causes such, for example, as sudden wind changes, changes in towing force and the like. In the case of a towed body carrying a magnetometer of high sensitivity such variations are a further source of difficulty in the operation of the detecting system. The cable necessary for accomplishing the dual purpose of supporting and towing a body of considerable bulk and weight and for conducting electrical signals from each of the three detector coils in the detector element and other signals to the control apparatus within the plane and still other signals to the control motors within the towed body, has of necessity considerable rigidity. A rigid connection between such a cable and the towed body would result in forces being applied to the body which tend to move the body such that the axis thereof is deflected angularly from its line of flight whenever the angle between the cable and either the longitudinal or transverse axes of the body was caused to change by the fortuitous variations in towing forces applied.

In order to avoid applying such forces to the body the present invention employs a set of gimbal rings at the center of which the towing cable is attached and this center is made to coincide with the cross sectional center of form of the body and below which the center of gravity is to be arranged. The cable is attached to the inner gimbal member and is therefore free to assume any angle with the longitudinal or transverse axes of the towed body which is appropriate for smooth and regular flight of the body along its course.

An object of this invention is to provide an aerodynamic body which can be successfully flown by means of a tow line secured to an aircraft without appreciable variation of the body from a desired heading either in respect to pitch, roll or course.

Another object of the invention is to provide a means of towing a body beneath and behind the towing aircraft in such a manner that variations in the towing stresses will not set the towed body into oscillation.

A further object is to provide an aerodynamic body for movably supporting a sensitive magnetic detector therein and having provisions for maintaining the detector continually in accurate alignment with a component of the ambient magnetic field under control of apparatus within a towing aircraft.

Still another object of the invention is to provide a method of stabilizing a towed body by adjusting the center of gravity of the body to a position directly beneath the point of support of the body during towed flight thereof thereby to prevent oscillations of the body.

Other objects, advantages and improvements will be apparent from a consideration of the following description, taken in connection with the accompanying drawings, in which like numerals of reference are employed to designate like parts throughout the several views and in which:

Fig. 1 generally illustrates the system in which the invention is employed for detecting concealed magnetic bodies;

Fig. 2 is a view of the aerodynamic body of Fig. 1, somewhat enlarged and partly in vertical section, showing an arrangement of adjustable detecting apparatus within the body and the means for suspending and towing the body;

Fig. 3 is a view of the aerodynamic body partly broken away and taken along the line 3—3 of Fig. 2;

Fig. 4 is an enlarged top plan view of the gimbal ring suspension and towing structure and the means of attachment thereof to the frame on which the detecting and orientating mechanism is assembled;

Fig. 5 is a sectional view taken along the line 5—5 of Fig. 4 and showing the details of attachment of the strain member of the towing cable to the inner gimbal member;

Fig. 6 is a sectional view of the gimbal arrangement taken along the line 6—6 of Fig. 4;

Figs. 7 and 8 are elevational and end views, respectively, of a circular aerodynamic body showing in schematic form the spaced relation between the center of form and the adjusted position of the center of gravity thereof, Fig. 8 additionally illustrating the means for "trimming" the body prior to flight.

Referring now to the drawings for a more complete understanding of the invention and more particularly to Fig. 1 thereof, there is shown thereon an aircraft generally designated by the numeral 10 having a reeling mechanism 11 therein for securing the aerodynamic body 15 to the aircraft during the take-off, and for paying out a length of cable 14, as required to tow the body 15 at a suitable distance from the aircraft, the reeling mechanism including any conventional reel locking means 19 to maintain the proper length of payed out cable. An aperture within the aircraft through which the cable may be payed out and adjusted to any suitable setting of the reeling mechanism is indicated by 12. A cable guide pulley 13 is employed to cause the cable to emerge centrally from the aperture 12 and to prevent contact of the cable with the body of the aircraft. A submarine indicated generally by the numeral 16 which, by way of example, may be the magnetic object to be detected by aerial exploration of the magnetic field thereabove, is illustrated at the lower portion of the figure.

As shown on Fig. 2, the cable 14 includes a strain member 20 of flexible non-magnetic material suitable for the purpose, such for example, as Phosphor bronze, which supports the body generally and a suitable electric cable 25 formed integrally therewith throughout substantially the length thereof which terminates in a plug connector 26 within the aerodynamic body 15. The aerodynamic body comprises a forward portion 17, a cylindrical central portion 18, a tapered rear portion 21 and a fin assembly 22 suitable for guiding the adjusted body along a desired course. The upper surface of the central portion 18 is provided with an aperture 23 of sufficient size to permit considerable lateral movement of the cable 14 without the cable being brought into engagement with the shell of the body when the strain member 20 thereof is attached at the center of form as illustrated.

Secured to the portion 18 at the periphery of the aperture 23 is a flexible waterproof boot 24 attached to the cable 14 and sealed thereto in any suitable manner such that the cable may move freely within the aperture 23 without appreciable restraint by the boot 24 and thereby provide a watertight closure for the aperture 23. The cable 14 divides beneath the boot 24 into two portions or branches, one of which comprises the strain member 20 by which the body is supported and towed, and the other comprises the electric cable 25 which provides the necessary electrical connections for transmitting signals detected by the detector element within the body to certain amplifying, control and indicating apparatus 29 on the aircraft connected to the cable 25 by a length of cable 30 and a slip ring arrangement connected to the reeling mechanism as is well known in the electrical art. The apparatus 29 is adapted to provide power impulses for the automatic adjustment of the detector mechanism in response to signals received from the detector coils.

Numeral 27 indicates a reinforcing ring within and secured to the central portion of the body 18 in which a flanged centering ring 28 is supported in rotatable and snug relation when the frame 32 has been assembled within the body. A reinforcing ring 31 is provided at the forward end of the central portion 18 and serves as aligning means by which the forward portion of the body 17 is connected to the central portion 18 in aerodynamical relationship therewith in any suitable manner as by the screws illustrated, after the frame 32 has been mounted therein.

A pair of mounting brackets 33, Fig. 3, are secured to the frame 32 and adapted to be engaged by the pins 34 attached to mounting blocks 35 which thus secure the forward portion 17 in accurate alignment with the frame 32 which in turn is aligned with the central portion 18 and fixed in longitudinal position between the blocks 35 and the ring 31. A pair of grooved mounting guides 36 in which the orienting fins 37 are slideably inserted are also provided whereby a definite circumferential orientation is maintained and the vertical spacing of the forward end of the frame in the body is determined.

A reinforcing bracket 38 is employed to secure the supporting ring 28 to the frame 32 in perpendicular relationship thereto. This ring 28 is additionally secured to the frame 32 at the inner periphery of the ring by means of a plurality of screws, Fig. 3, or other suitable fastening means.

As best shown on Fig. 2, a balancing weight 41 is secured to the forward end of the nose portion 17 by means of the bolts 42 and the ring bolt 44. Numeral 43 represents holes of various sizes and depths drilled in the weight 41 for the purpose of additionally adjusting the weight, trim and center of gravity of the entire body. The arrangement of the holes 43 subsequent to the assembly of the frame 32, and the apparatus thereon, within the body 15, is one means of correcting any slight departure from the desired balance and trim of the body. A further means of finally adjusting weight and trim is by suitable arrangement of a plurality of trim weights 45 and 46 secured about the inner surface of the portion 18, Figs. 5 and 8. Another means of changing the trim of the body is by the addition of one or more trim tabs 39 to the fin assembly thereby to alter the position of the center of gravity along the line B, Fig. 7. An annular mounting member 47 is attached to the frame 32 and carries within it the detecting element which is to be kept oriented with respect to the magnetic field to be measured. This detecting element is enclosed within a housing 51 which is supported and rotatable about the bearings 52 within a gimbal member 48 supported rotatably about a transverse axis 49, Fig. 2.

Within the housing 51 are three detecting coils designated 53, 54 and 55 respectively which receive impulses from the control equipment on the aircraft over the cable 14 and which comprise the detecting element of the device. The coil 54 in practice is maintained in substantially continuous alignment with the direction of the magnetic field to be measured or detected whenever the device is in operation and the detecting element is said to be aligned with the field when this coil is parallel to the lines of force comprising the field. Coil 53 is mounted such that it lies along the axis of the bearings 52 and is parallel thereto at all times and perpendicular to the axis of coil 54 regardless of the orientation of the coils 54 and 55. Coil 55 is mounted with its axis perpendicular to the axes of coils 53 and 54 respectively. The housing 51 and the coils therein are rotatable about the axis of the bearings 52 by means of a control line 66 shown wrapped about the housing near the center thereof and over a grooved pulley 65. The control line 66 leads out through the transverse support for the gimbal ring 48 in a direction parallel to axis 49 whence it passes over suitable pulleys to an electrical control motor 60. The motor 60 is rotated in either direction selectively in accordance with signals from coils 53 and 55 which are passed through cable 14 to the amplifying and switching equipment located in the aircraft 10 and thence back through the cable 14 to the control motor 60.

Similarly the gimbal member 48 and the detector element and housing 51 are rotatable about axis 49 by means of a similar control line 63 which is wrapped about a grooved pulley 64 attached to the ring 48, and thence back to control motor 62 as most clearly shown in Fig. 2. This motor is selectively rotatable in either direction as in the case of motor 60 in response to signals from the coils 53 and 55 received through the cable 14. In practice the presence of any field other than a field perpendicular to both of the coils 53 and 55 causes the motors to operate such as to effectively align coil 54 with the field and thereby bring the motors to rest with the field perpendicular to the coils 53 and 55, respectively. Suitable means and apparatus for accomplishing this result are known in the art and do not form a part of this invention. The motor mechanism including the motors 60 and 62 is indicated generally by 61. As long as the motors maintain the coil 54 in alignment with the field the detector element responds to the total magnitude of the field, and no signals are generated in coils 53 and 55.

Signals generated in coils 53, 54 and 55 are transmitted by internal connections (not shown) to the drum 56 on which are located four slip rings and four contact brushes engaging them, respectively. Leads 58 from these brushes pass along the gimbal ring support 57, the leads 58 being connected, respectively to four slip rings, two of which are shown on each end of the support 57, Fig. 3. Each slip ring is in engagement with a contact brush and connections are made between these contacts and the plug connector 26 by the leads 58, shown on Fig. 2 broken away at the plug 26 and near the support 57.

By the structure recited signals from the detector element pass from the housing 51 through two sets of slip rings and to the plug connector, thence by cable 14 to the control apparatus in the aircraft whence are transmitted impulses as necessary to actuate the motor mechanism 61 and thereby to bring coil 54 substantially parallel to the field to be measured, and to measure fields or variations thereof by means of the detector element and transmit signals corresponding thereto to indicating apparatus located in the aircraft.

Referring now to Fig. 4, a mounting plate indicated generally by 71 is slideably attached to the frame 32 and on which is mounted the gimbal ring supporting the aerodynamic body. Portions of the frame 32 are shown partly in section thereby revealing a longitudinal groove 72 along the center face of each of the two side members of the frame. The mounting plate 71 is shown engaging the two grooves 72 in such a manner that the mounting plate may be adjusted along the length of the frame 32 by sliding it within the grooves 72. When the proper position has been determined for the mounting plate the clamping bar 73, which is secured to the mounting plate by the screws 74, is clamped to the frame 32 by tightening the wing nuts 75.

A circular portion of the mounting plate is cut away and a gimbal ring 76 is mounted therein rotatably about the line 5—5 on the mounting elements 82. Within the gimbal ring 76 is another mounting plate 77 so arranged as to rotate on the adjustable mounting members 78 about the line 6—6. Thereby the mounting plate 77 is adapted to be rotated about the line 5—5 or 6—6 or both, as the case may be.

Referring to Fig. 5 the mounting plate 77 is provided at the center thereon with a swivel bearing 85 which secures a spindle 84 rotatably to the plate 77 whereby torque in the towing cable is prevented. A gimbal ring 76 is also mounted on the bearing supports 82 by means of the ball bearings 83 thereby to reduce the friction between these parts. The upper end of the spindle 84 is bifurcated to receive the strain core 20 of the cable 14. A loop is formed in the end of the strain core for engagement with a pin 86 which is passed therethrough and screwed through spindle 84.

In Fig. 6 further details are shown of a convenient manner of mounting the plate 77 and spindle 84. The mounting members 78 are shown pivotally attached to the gimbal ring 76 by means of ball bearings 81 to reduce the friction in the movement of the gimbal rings about the axis 6—6. The plate 71 slideably engages the frame 32 at the grooves 72 and the clamping bar 73 is in juxtaposition with the frame 32 with which it may be brought into fixed engagement by means of the wing nuts 75 when the point of support of the body has been moved to a desired setting.

From the foregoing it will be clearly apparent that a structure has been provided in which any movement imparted to the cable because of variations in the air resistance encountered thereby or because of irregularities in the force applied by the towing craft are prevented from affecting the heading, roll or pitch of the aerodynamic body. The aerodynamic body thus is freed from a considerable portion of the forces tending to cause oscillation or other types of instability and unsteadiness of the towed body in flight.

In order that the towed body may be further stabilized and steadied against the usual tendencies of such a body to fly erratically the position of the point of suspension corresponding to the point of application of the towing force at the center of the gimbal structure within the body and the position of the center of gravity of the body must be coadjusted until a predetermined spaced relation exists therebetween. Applicant has found that an adequate directing force is applied by the fin structure tending to keep the aerodynamic body parallel to its line of flight when the point of suspension is adjusted to a setting substantially one-third of the distance from the nose to the after end of the body. Further adjustment, if necessary, of the point of application of the towing force, is accomplished by sliding the plate 71 along the grooves 72 within the frame 32 and by securing the plate 71 with respect thereto by tightening the screws 75. The screw mounting members 78, Figs. 4 and 6, are adjustable whereby the mounting plate 77 may be moved laterally, if necessary, for a sufficient distance to center the axes of rotation of the plate 77 and of the spindle 84 with the center of form of the body i. e. line A of Fig. 7. It has been found in practice that stable flight is facilitated when this adjustment has been made.

It is also important that the center of gravity be adjusted to a position directly beneath the center of suspension and at the point 40 on the line B, Fig. 7. The exact position of the point of suspension of the body along the line A is not critical, provided the center of gravity is correspondingly shifted along the line B to a position directly beneath the center of suspension. When the center of gravity is not adjusted along the line B to a position directly below the point of suspension of the body, irregularity of towing and other forces produce irregular motions of the aerodynamic body such that the apparatus contained therein is not effective to maintain the detector element in sufficiently close alignment with the lines of force of the magnetic field to be detected with the result that spurious indications of changing field are obtained. Means are therefore provided for adjusting the center of gravity along the line B in addition to the means provided for adjusting the point of suspension along the line A. Furthermore, by arranging the center of gravity a small distance below the center of form, Figs. 7 and 8, an advantage is obtained in that the slightest tendency of the body to roll about its longitudinal axis is immediately corrected by the gravity couple which operates to correct the roll.

An aerodynamic body has thus been provided which is adapted to be towed in stable flight by an aircraft and which will support and enclose delicate and sensitive detecting apparatus, the proper functioning of which depends on accurate maintenance of orientation of the detecting apparatus with the direction of the lines of force comprising the magnetic field to be detected or measured.

While the invention has been described in detail with reference to the detection of hidden submarines, it is obviously not so limited as it may be employed with advantage in the detection of irregularities in magnetic fields caused by the presence of manufacturing plants, other building structures and subterranean bodies of ore such as may be encountered in geomagnetic surveys. Furthermore, by reason of the steady and stable flight of the towed body resulting from the practice of this invention, small changes in the magnetic field, whether of rapid or gradual nature, such, for example, as changes caused by masses of matter differing in magnetic properties but slightly from the surrounding terrain, may be detected, and the locations thereof determined by aerial geomagnetic surveys.

While the invention has been described with reference to a particular example which gives satisfactory results, it will be apparent to those skilled in the art to which the invention pertains, after understanding the invention, that various changes and modifications may be made without departing from the spirit and scope of the invention and it is intended, therefore, in the appended claims to cover all such changes and modifications.

The invention herein described and claimed may be manufactured and used by or for the Government of the United States of America for governmental purposes without the payment of any royalties thereon or therefor.

What is claimed as new and desired to be secured by Letters Patent of the United States is:

1. In towed airborne magnetic field detecting apparatus, an aerodynamic body adapted to be towed from an aircraft in flight, means within the body for detecting the total value of the magnetic field traversed by the body, signal responsive means within the body for continually aligning the detecting means with the lines of force of the magnetic field as the detecting means deviates therefrom in response to slow angular movements of the body due to changes in heading of the aircraft, a cable for supporting and towing said body at a distance from the aircraft, said cable including means for transmitting electrical signals between said detecting and aligning means and control apparatus in the aircraft, a gimbals arranged at the cross sectional center of form of said body and above the center of gravity thereof thereby to prevent sudden angular movements of the body in flight with respect to the cable, said gimbals being adapted to support the body, and means for securing the cable to said gimbals.

2. In a magnetic field detecting system for an aircraft the combination of a tow line, a nonmagnetic aerodynamic body adapted to be flown through the air by said tow line, means including the tow line for supporting and towing said body from the aircraft, means including gimbals for securing said tow line at the central axis of the body whereby variations in the angle between the cable and the body are not effective to change the heading of the body, and means for adjusting the center of gravity of the body to a point substantially beneath said gimbals when the body is in a predetermined horizontal position.

3. An aerodynamic body having a smooth surfaced symmetrical covering and adapted to be towed by an aircraft, said body having the center of gravity thereof disposed beneath the center of form of the body and also having an opening in the upper portion thereof above the center of gravity, a gimbals arranged at the center of form of the body beneath said opening and adapted to support and tow the body, and a cable disposed within said opening and secured to said gimbals whereby the body is adapted to be supported and towed by the cable in freely variable axial relation therewith.

4. In a magnetic field detecting system of the character disclosed, an elongated aerodynamic body, said body having an aperture in the upper surface and the center of gravity thereof arranged directly beneath the aperture and beneath the axis of the body, a gimbals secured to the body at the axis thereof substantially beneath the aperture, a cable disposed within said aperture, and a swiveled device for connecting the cable to said gimbals.

5. In an aerodynamic body of the character disclosed, the combination of a magnetic detector movably mounted within said body, means including a cable attached at the cross sectional center of form of said body for towing the body stably from a controlling aircraft, means for shifting the center of gravity of said body to a point beneath said center of form, multiple signal conducting means along said cable between the body and control apparatus within said aircraft, means within the body for conducting signals between said conducting means and said magnetic detector, and means within the body including control motors and a plurality of lines from said motors to the magnetic detector for continually aligning the detector during stable flight with the ambient magnetic field in response to signals from the detector, the control apparatus and the motors.

6. In an aerodynamic body of the character disclosed, the combination of a magnetic detector movable therein, means including a cable secured at the cross sectional center of form of said body and above the center of gravity thereof for stably towing the body from a controlling aircraft, a plurality of electrical conductors within said cable and extending to said magnetic detector, and means within the body for moving the detector continually into alignment with the earth's magnetic field in response to signals received from the detector over said conductors while the body is towed by the aircraft.

7. In an aerodynamic body of the character disclosed, the combination of a magnetic detector mounted within said body and movable into alignment with a component of the ambient magnetic field, means including a cable connected at the center of form of the body and above the center of gravity thereof for towing the body stably from an aircraft in flight, a first plurality of conductor means extending along said cable between the body and control apparatus disposed within the aircraft and adapted to be operated by signals received from the detector, means within the body and controlled by signals received from said control apparatus for continually aligning the detector with said field component, and a second plurality of conductor means arranged within the body and interconnecting said first plurality of conductor means with the detector and with said aligning means whereby said detector and control apparatus signals are transmitted over said first plurality of conductor means.

8. In an airborne magnetic field detecting system of the character disclosed, an elongated non-magnetic aerodynamic body, a unitary towing and electrical signal conducting cable for towing the body from a controlling aircraft at a distance therefrom outside the field of magnetic influence of the aircraft, magnetic field detecting apparatus arranged within said body and including a field detecting element alignable with the lines of force of the ambient magnetic field, signal responsive means arranged within the body and responsive to signals transmitted through said cable for continually aligning the detecting element with the lines of force of the ambient field as the element deviates therefrom in response to slow angular movements of the body due to changes in heading of the aircraft, and means for preventing sudden angular movements of the body in flight with respect to the cable thereby to prevent generation of spurious signals by said detecting element, said last named means including said unitary cable and gimbals means for connecting the cable to the body at the cross sectional center of form thereof and above the center of gravity of the body.

9. An aerodynamic body adapted to be towed stably in flight from an aircraft by a cable interconnected therebetween and comprising a rounded nose portion, a hollow cylindrical central portion, a tapered rear portion, a fin assembly secured to said tapered rear portion, means forming within said cylindrical portion a substantially point suspension of said body from said cable effective to apply a directing force to said fin assembly sufficient to maintain the body parallel to its line of flight, said suspension means comprising a gimbals assembly, means for adjusting the gimbals assembly to bring the pivotal center thereof into a setting rearwardly of the nose portion by a distance equal substantially to one third the length of the body and in alignment with the cross sectional center of form thereof, swivel means for effectively connecting the cable to the gimbals assembly at the center thereof, and means for adjusting the center of gravity of the body to a point directly beneath said point of suspension and in predetermined spaced relation therewith effective to produce gravity couples sufficient to prevent rolling and pitching of the body about said point of suspension.

10. An aerodynamic body adapted to be towed stably in flight from an aircraft by a cable interconnected therebetween and comprising a rounded nose portion, a hollow cylindrical central portion, a tapered rear portion, a fin assembly secured to said tapered rear portion, a first annular member secured within said body at a point intermediate the ends thereof and having an annular seat around the inner periphery thereof, a second annular member for securing said nose portion to said central portion, a rectangular frame member mounted within said body, a third annular member secured to said frame and adapted to rest in the seat of said first annular member, tongue portions mounted adjacent the forward end of said frame and at the sides thereof, grooved portions in said second annular member and adapted to receive said tongue portions whereby the frame is supported within the body, means for locking said tongue portions in said grooved portions, said frame comprising a pair of side members extending longitudinally within said body, grooves arranged in mutually adjacent faces of said side members, a gimbals assembly comprising an outer gimbal member having tongues on two of its sides, said tongues being arranged for sliding movement in the grooves in said side members, clamping means for said outer gimbal member whereby the member may be held in any one of a plurality of positions along the grooves in the side members, said gimbals assembly having an inner gimbal member, said towing cable being secured to said inner gimbal member, the central portion of said body having an opening therein through which said supporting cable extends, and a flexible boot member secured to said cable and to said body at the periphery of said opening therein for excluding foreign matter from said body.

11. In a device of the character disclosed, the combination of an elongated streamlined body and means including gimbal structure for towing and supporting said body in stable aerodynamic flight.

12. A device for supporting a body for dynamic flight comprising, a gimbal mechanism including an outer ring pivotally secured to said body and an inner ring pivotally secured to said outer ring, a cable including a strain member, a support having two separable portions, one of said portions being secured to the inner gimbal ring, the other portion being secured to said strain member, and means for clamping said separable portions together.

13. A cable connector for a towed aerial body comprising, gimbals including an inner ring and an outer ring, said outer ring being pivotally secured to the body, an upstanding support secured to the inner gimbal ring, and means on said support for securing a towing cable thereto.

GERHARD O. HAGLUND.

REFERENCES CITED

The following references are of record in the file of this patent:

UNITED STATES PATENTS

| Number | Name | Date |
|---|---|---|
| 1,302,007 | Calthrop | April 29, 1919 |
| 1,418,788 | Fokker | June 6, 1922 |
| 1,977,198 | Nicolson | Oct. 16, 1934 |
| 2,124,867 | Akermann | July 26, 1938 |
| 2,385,392 | Van Dusen | Sept. 25, 1945 |
| 2,388,109 | Abel et al. | Oct. 30, 1945 |
| 2,396,453 | Windle | Mar. 12, 1946 |
| 2,404,806 | Lindsey | July 30, 1946 |
| 2,424,772 | Rieber | July 29, 1947 |
| 2,427,666 | Felch | Sept. 23, 1947 |
| 2,468,968 | Felch et al. | May 3, 1949 |

FOREIGN PATENTS

| Number | Country | Date |
|---|---|---|
| 296,040 | Great Britain | Aug. 24, 1928 |
| 546,235 | Great Britain | July 3, 1942 |
| 223,699 | Switzerland | Dec. 16, 1942 |